(12) United States Patent
Pirkle

(10) Patent No.: US 6,616,058 B1
(45) Date of Patent: Sep. 9, 2003

(54) VALVE

(75) Inventor: Fred L. Pirkle, Abington, PA (US)

(73) Assignee: Therm-Omega-Tech, Inc., Warminster, PA (US)

( * ) Notice: Subject to any disclaimer, the term of this patent is extended or adjusted under 35 U.S.C. 154(b) by 0 days.

(21) Appl. No.: 10/172,444

(22) Filed: Jun. 14, 2002

(51) Int. Cl.$^7$ .......................... G05D 23/02; F16T 1/04
(52) U.S. Cl. ........................ 236/59; 236/93 R
(58) Field of Search .................. 236/59, 93 R, 236/33, 43, 66, 101 R; 60/527

(56) References Cited

U.S. PATENT DOCUMENTS

| | | | | |
|---|---|---|---|---|
| 1,964,638 A | * | 6/1934 | Kreidel | 138/46 |
| 1,972,907 A | * | 9/1934 | Shaw | 184/7.3 |
| 2,319,498 A | * | 5/1943 | Gerard | 62/223 |
| 2,838,072 A | * | 6/1958 | Stumm, Jr. | 138/26 |
| 2,966,170 A | * | 12/1960 | Raulins | 137/468 |
| 3,340,899 A | * | 9/1967 | Welty et al. | 138/43 |
| 3,378,063 A | * | 4/1968 | Mefferd | 165/300 |
| 3,977,600 A | * | 8/1976 | Sheets, Jr. | 236/93 R |
| 4,327,863 A | * | 5/1982 | Foller | 236/59 |
| 5,967,410 A | * | 10/1999 | Lammers | 236/93 R |

* cited by examiner

Primary Examiner—William E. Tapolcai
(74) Attorney, Agent, or Firm—Howson and Howson

(57) ABSTRACT

A valve comprises an assembly of elastomeric elements confined in a cylindrical space, with one end of the assembly engageable with a valve seat at one end of the cylindrical space. The valve is constructed to provide three successive converging and diverging sections in the fluid flow path, the intermediate section being provided by the valve element and seat. The restrictions exerts a choking for maintaining pressure in a steam system when the valve is used as a steam trap. A rigid, abrasion-resistant element, may be incorporated into one of the elastomeric elements, and a thermally responsive wax may be incorporated into one of the elements to alter its expansion characteristics. A plunger may be incorporated into the valve to exert a force on the elastomeric elements, allowing adjustment of the degree of subcooling when the device is used as a steam trap.

23 Claims, 8 Drawing Sheets

VALVE

FIELD OF THE INVENTION

This invention relates to flow control valves, and more particularly to a flow control valve which can be used to regulate or stop the flow of steam or other high temperature fluid. The invention has broad application in fluid flow control, but is particularly useful as a thermally responsive fluid valve, and has particular utility in the elimination of condensate from the steam system in an apparatus such as a steam turbine, a steam engine, a steam heating system for a building, a steam autoclave, a steam-operated humidifier, steam-operated chemical processing equipment, and other equipment utilizing steam as a source of heat, pressure or humidity.

BACKGROUND OF THE INVENTION

To achieve optimum operating efficiency in such equipment, it is desirable to eliminate condensate to the extent possible. In order to do this automatically, various devices known as steam traps have been devised. In general, a thermostatic steam trap, which is situated at a suitable location in a steam line, detects the presence of condensate by sensing the temperature of the condensate, which is lower than that of steam. When condensate is detected, an aperture in the steam trap opens to discharge the condensate. The discharged condensate is replaced by steam, which, by virtue of its higher temperature, causes the aperture to reclose. As a result, the steam trap discharges condensate automatically without allowing significant amounts of steam to escape.

Most thermostatic steam traps currently in use are either bimetallic disc steam traps or bellows-type steam traps. As the name implies, the first type of steam trap utilizes a bimetallic disc as a temperature sensing element. A stack of bimetallic discs is disposed inside a housing having an inlet connected to a steam system, and a valve is arranged to exhaust fluid from the steam system as the fluid flows through the housing past the stack of bimetallic discs. The stack mechanically moves a valve element toward and away from a valve seat, depending on the temperature of the fluid inside the housing. The bellows type steam trap utilizes a fluid-filled bellows, instead of a stack of bimetallic discs, as a temperature sensing element.

In both cases, when the temperature sensing element is exposed to steam, the temperature of the steam causes the valve element to move, in the closing direction, into contact with the valve seat, while the lower temperature of condensate accumulating in the sensor housing causes the valve to move away from the seat in order to discharge the condensate, until the condensate is exhausted and the sensor is once again exposed to steam, whereupon the sensor once again causes the valve element to close.

The temperature of saturated steam increases with increasing pressure according to a well-defined relationship known as the steam curve. Likewise, the temperature of the condensate in a closed system increases with increasing steam pressure. Accordingly, in an ideal steam trap, the temperature at which the steam trap discharges condensate should be higher when the steam pressure is high, and lower when the steam pressure is lower. In a conventional steam trap utilizing a stack of bimetallic discs as the temperature sensor, a higher steam temperature causes the sensor to exert a greater closing force on the valve element, while at the same time, the higher pressure exerts a force on the valve element tending to move the valve element in the opening direction. Therefore, in a well-designed bimetallic disc steam trap, a balance is achieved, by which the device follows the steam curve, discharging condensate as it accumulates, regardless of the steam pressure in the system.

A thermostatic bellows steam trap functions in a similar manner. The fluid within the bellows expands with increasing temperature, urging the valve element in the closing direction, while increasing pressure acts to compress the bellows. The oppositely acting effects of temperature and pressure, when appropriately balanced, cause the device to discharge condensate at a temperature near the saturated steam temperature at any pressure.

These conventional steam traps have various limitations and disadvantages, including high manufacturing cost, large size, difficulty of adjustment, and limited service life.

SUMMARY OF THE INVENTION

An object of this invention is to provide a simple and effective steam trap that exhibits one or more of the following advantages over conventional steam traps: lower cost, compactness, ease of adjustment, and long service life.

It is also an object of the invention to provide a simple and effective temperature-responsive fluid valve for use in a broad range of applications using steam and other fluids.

Still another object of the invention is to provide a simple and effective fluid control valve for use in various fluid flow control applications in which temperature responsiveness is not required.

The valve in accordance with the invention comprises a housing having a tubular side wall and two end walls. A first end wall at a first end of the side wall, defines one end of an internal space. A second end wall at the opposite or second end of the side wall, has a centrally located aperture arranged to provide fluid communication between the internal space and the exterior of the housing. At least one passage extends through the side wall at a location adjacent the second end wall, and is arranged to provide fluid communication between the exterior of the housing and the internal space. Preferably a plurality of such passages is provided. A valve element substantially fills all of the internal space except for a portion thereof adjacent the second end of the side wall. At least the part of the valve element which contacts the tubular side wall of the housing is composed of an elastomer. In some applications, the entire valve element can be composed of elastomer. In others an expansible wax can be incorporated in a space inside the elastomer. In still others, a rigid element can be embedded in the elastomer at a location such that the rigid element, rather than the elastomer, engages a valve seat.

The valve seat is in the form of a boss surrounding the centrally located aperture of the second end wall and extending toward the first end wall. By virtue of its elastomeric content, the valve element is deformable from a first condition in which it is spaced from the seat and allows fluid communication between the one or more passages in the side wall and the aperture in the second end wall, to a second condition in which it engages the seat, thereby closing the aperture and preventing fluid communication between the passages in the side wall and the aperture.

The temperature coefficient of expansion of the elastomer is preferably in the range from 0.01%/° F. to 0.2%/° F., and in a preferred embodiment of the invention, the valve element is composed of a plurality of cylinders disposed in a stack in the housing, in coaxial relationship with the tubular side wall of the housing. The use of a plurality of cylinders simplifies molding of the elastomer, and also makes it possible to vary the characteristics of the valve member by combining different cylinders. Thus, one cylinder might incorporate a thermally expansible wax or other composition, or a rigid, seat-engaging element, while the other is formed entirely of elastomer. In other cases, both cylinders can be composed entirely of elastomer The side wall is preferably formed of metal, and the elastomer is in contact with the side wall, so that heat is rapidly conducted through the side wall to and from the elastomer.

In a preferred embodiment, the first end wall comprises a metal plate secured to the side wall and in contact with the elastomeric member. The operating temperature of the valve can be set by preliminarily bending the metal plate into a dish shape, so that it has a convex face in contact with the valve member. The extent to which the plate is bent determines the temperature at which the valve closes at a given pressure. A similar adjustment can be effected by other means, for example, a plunger adjustable by a screw or by a handwheel.

The side wall of the housing may be provided with a shoulder formed adjacent its first end, and the metal plate can be held against the shoulder by crimping a thin-walled ring projecting from the shoulder.

To retain the valve element in proper position in the tubular housing, another shoulder is formed on the side wall inside the internal space, adjacent, but spaced from, the second end, and facing the first end wall. The valve element has an end surface facing the second end wall, the end surface having a peripheral area in engagement with the shoulder so that at least the peripheral area is retained in spaced relationship with the second end wall. Because the outer part of the valve element is formed of elastomer, the valve element can deform and approach the seat despite the fact that the periphery of its end surface is immobilized by engagement with the shoulder.

In a preferred embodiment of the valve, the housing includes a passage connecting the aperture with the exterior of the housing. This passage has a central portion narrower than the aperture, a connecting portion converging from the aperture to the central portion, and a diverging portion connecting the central portion to the exterior of the housing.

The side wall has an exterior face and an interior face, and each passage extending through the side wall at a location adjacent the second end wall has an outer end opening in the exterior face of the side wall, an inner end opening in the interior face of the side wall, and a tapered portion extending through a portion of the side wall between the inner and outer end openings, the tapered portion having a wider end toward the exterior of the housing and a narrower end toward the interior of the housing. A space, between the boss surrounding the central aperture and the side wall, provides a cross-section to the flow of fluid larger than the total of the cross-sections of the narrower ends of the tapered portions. Each passage extending through the side wall at a location adjacent the second end wall has an inner end opening in the interior face of the side wall directly opposite to the boss, and the space between the boss and the side wall provides a larger cross-section to the flow of fluid than the space between the boss and the elastomeric element when the elastomeric element is spaced from the boss to allow fluid communication. The centrally located aperture in the second end wall of the housing also has a cross-section larger than said space between the boss and the elastomeric element. Consequently, in the preferred embodiment, there are three separate stages in which the flow cross-section converges and then diverges: one at the location of the openings in the side wall; another at the location at which the elastomeric member approaches the valve seat; and a third in the exit passage beyond the aperture in the second end wall.

The exterior face of the side wall preferably has an annular recess in a portion adjacent its second end, and the passages extend through the part of the side wall having the annular recess. A filter screen spanning the recess is therefore spaced from the openings of these passages.

The second end wall may have an extension with external threads for mounting the valve.

For adjustment of the size of the portion of the internal space adjacent the second end of the side wall, a plunger may be arranged so that it extends through an opening in the first end wall, the plunger having an end in contact with, and exerting a compressive force on, the valve element.

The valve element may composed in part of an elastomer, and include a thermally expansible material, having a coefficient of expansion greater than that of the elastomer, and situated in an interior space within the valve element and surrounded by part of the elastomer.

The valve element may include a rigid element in elastomer, and arranged so that the part of the valve element which engages the seat is part of the rigid element.

As will be apparent from the following detailed description, the valve structure, comprising a valve element, composed at least in part of an elastomer, in a tubular enclosure, not only provides a compact and reliable steam trap operable over a wide range of pressures, but may also be utilized advantageously in other applications in which a temperature-responsive fluid valve is required, and also in other fluid flow control applications in which temperature responsiveness is not required.

Other objects, details and advantages of the invention will be apparent from the following detailed description when read in conjunction with the drawings.

DETAILED DESCRIPTION OF THE PREFERRED EMBODIMENT

Figure 1:
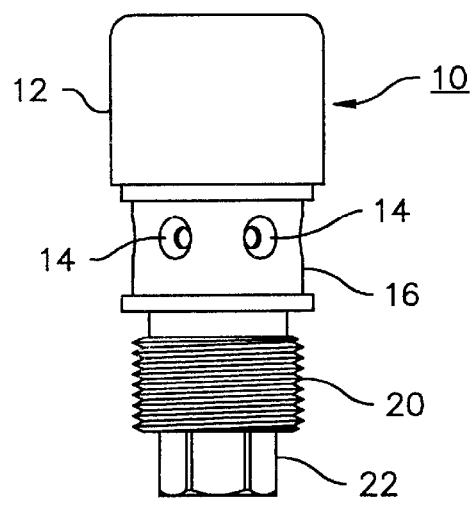
FIG. 1 is an elevational view of a valve in accordance with the invention, in an embodiment designed to serve as a steam trap, with a filter screen removed.

As shown in FIG. 1, the valve 10 comprises a housing 12, preferably having a circular cross-section in plan view. The housing is provided with a plurality of radial fluid inlet passages 14 formed in a recess 16 machined in the outer wall of the housing. An extension 18, preferably unitary with the housing at the bottom, has external threads 20 for mounting the device in a threaded opening (not shown), and a hexagonal head 22, which, in some installations, may be used to facilitate installation and removal of the device from its mounting using a wrench.

Figure 2:
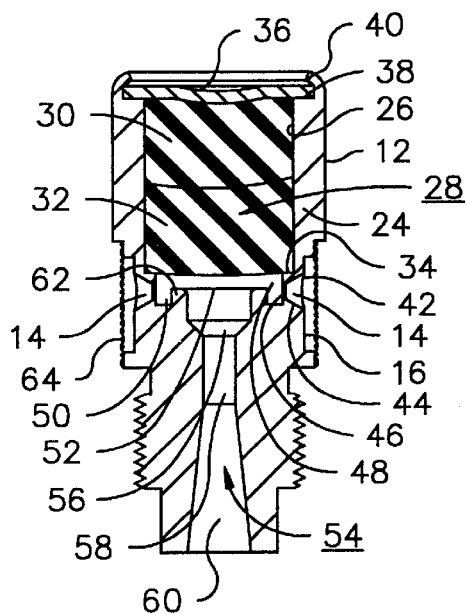
FIG. 2 is an axial section of the valve of FIG. 1, showing a deformable elastomeric valve element in a condition in which it is spaced from the valve seat.
Figure 3:
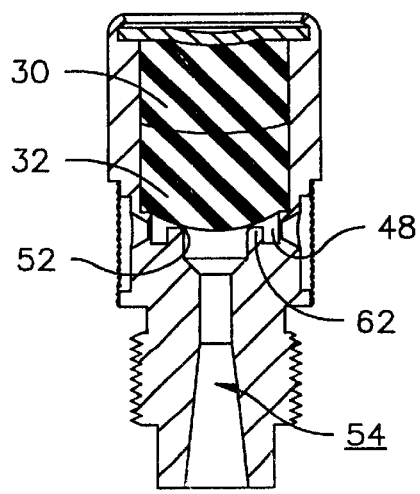
FIG. 3 is an axial section of the valve of FIG. 1, showing the deformable elastomeric valve element in a partially expanded condition, in which it is approaching the valve seat.
Figure 4:
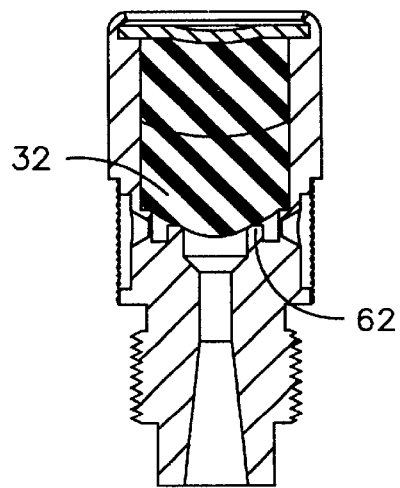
FIG. 4 is an axial section of the valve of FIG. 1, showing the deformable elastomeric valve element in a fully expanded condition, in which it is in closing engagement with the valve seat.

FIGS. 2, 3 and 4 show the internal components of the valve in three stages of operation: fully open, partially closed, and fully closed, respectively. As shown in FIG. 1, the housing 12 comprises a tubular side wall 24, preferably having a circular, cylindrical inner face 26 surrounding an internal space 28. Within the internal space are two, stacked, cylindrical, elastomeric elements 30 and 32, the lower element 32 being retained by an annular shoulder 34 formed in the interior of the housing at the lower end of inner face 26. The shoulder 34 engages a ring-shaped area at the periphery of the lower face of elastomeric element 32. The use of two axially short elastomeric elements instead of one simplifies manufacture because it is easier to mold a short elastomeric element than to mold a longer element. In addition, the use of two axially short elements makes it possible to utilize different elements in order to achieve desired special operating characteristics or to provide other feature such as abrasion resistance in the valve element.

The upper end of the housing is closed by a metal disc 36, which engages shoulder 38 at the upper end of the housing and is secured in place by crimping of a thin-walled extension 40 of the tubular side wall 24.

The cylindrical elastomeric elements 30 and 32 fit closely to the interior face 28 of the side wall 24 and the upper element 30 is in engagement with the disc 36. Thus, the elastomeric elements substantially fill the internal space 28 except for a lower portion thereof just below the bottom of the lower elastomeric element 32. Because the elastomeric elements are confined, filling the upper portion of the internal space 28, together they constitute an elastomeric member the linear expansion of which is substantially directly proportional to its volumetric expansion.

Preferably, the elastomeric elements are composed of a material resistant to thermal damage or wear resulting from contact with flowing steam, and having a temperature coefficient of expansion preferably between 0.01%/° F. and 0.2%/° F. Materials suitable for use in steam trap applications include the fluoroelastomer sold under the trademark VITON, available from DuPont-Dow Elastomers, of Wilmington, Del., EPR (Ethylene-propylene rubber), and various silicone rubbers available from GE/ASI, of Garrett, Ind. The thermally responsive compositions described in U.S. Pat. No. 5,816,493, granted Oct. 6, 1998, may also be used, and the disclosure of that patent is incorporated herein by reference.

The radial passages 14, of which there are six in the valve shown, are situated slightly below the shoulder 34. Each such radial passage 14 has a large opening 42, and a tapered section 44 converging toward a narrow inner opening 46. The passages communicate with an internal space 48 below the bottom of elastomeric element 32.

A bottom wall 50 of the housing, which is spaced from the bottom of element 32, has a central aperture 52. The central aperture 50 is an opening of a elongated passage 54 having a converging portion 56, a narrow intermediate portion 58 and a diverging portion 60 leading to the exterior of the housing.

The aperture 52 is surrounded by an annular boss 62, which extends upward from the bottom wall 50 toward the elastomeric element 32. The annular boss, which serves as a valve seat, is spaced inwardly from the side wall of the housing, and is located opposite the narrow inner openings 46 of the radial passages.

As shown in FIG. 2, the recess 16 in the outer wall of the housing is spanned by a filter screen 64, which keeps particulate matter from interfering with the proper operation of the valve.

The operation of the valve is depicted in FIGS. 3 and 4. As the temperature of the elastomeric member consisting of elements 30 and 32 increases, they expand toward the valve seat, deforming so that the bottom face of the lower element 32 becomes convex as shown in FIG. 3. At this stage, it will be seen that the portion of space 48 surrounding the annular boss 62, the narrow space between the boss and the bottom of elastomeric element 32, and the part of passage 54 just below the aperture 52, provide a flow passage which converges and then diverges. The tapered radial passages 14 together with the space 48 also provide a flow passage which converges and then diverges. Similarly, passage 54 converges and then diverges. Therefore, in the direction of flow through the valve, there are three successive converging and diverging passage sections, providing the equivalent to a labyrinth, which exerts a choking effect on the flow of steam, which is needed to maintain pressure in the steam system. The intermediate section, constituted by the elastomeric element 32 and the valve seat serves both as a choke and as a variable throttle controlling the flow of steam.

As the elastomeric elements further expand, the lower element 32 engages the valve seat, as shown in FIG. 4, completely shutting off flow through the valve.

When the valve is in use as a steam trap, the heat from the high temperature steam surrounding the housing is conducted through the housing wall, and through the metal disc 36, to the elastomeric material, keeping it expanded and in the condition depicted in FIG. 4, in which it completely closes off flow through the valve and prevents leakage of steam. The steam pressure exerts an upward force on the portion of the bottom of element 32 surrounding the seat. This upward force balances the downward force exerted by the elastomeric elements as a result of their thermal expansion, causing the valve to follow the steam curve. As a result, the valve opens when the elastomeric elements sense a reduction in temperature surrounding the housing as condensate accumulates, and the valve will release condensate in this manner regardless of the temperature of the steam.

As seen in FIGS. 2, 3 and 4, the metal disc 36 is dish-shaped, so that its bottom surface, which engages the upper part of elastomeric element 30 is convex. The temperature at which the valve closes at any given steam pressure depends on the shape of the metal disc, and therefore can be selected by choosing an appropriately shaped disc.

Figure 11:
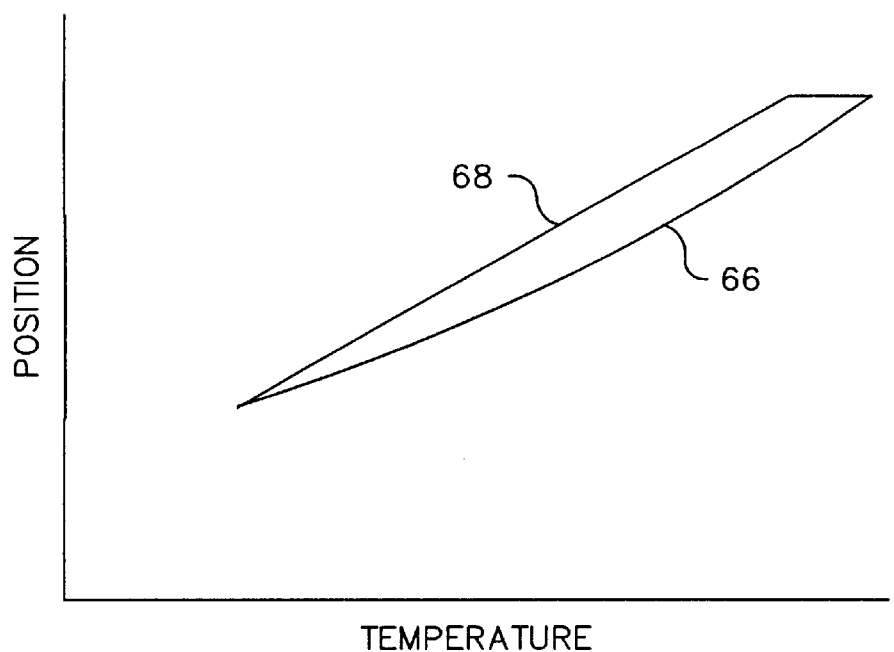
FIG. 11 is a typical hysteresis curve illustrating the movement of an expansible elastomeric element of the valve with changes in temperature.

As shown in FIG. 11, the expansion and contraction of a thermally responsive elastomeric element follows a hysteresis curve. Thus, the position of the face of the elastomeric element 32 which approaches the valve seat follows path 66 as the temperature of the elastomer increases. The curve shows the temperature rising from a temperature of about 75° F. to about 300° F. in a typical steam trap in accordance with the invention. As the temperature decreases, the end face of element 32 does not immediately move. It remains stationary until the temperature falls to about 275° F., and then follows path 68 as the temperature continues to decrease.

Figure 12:
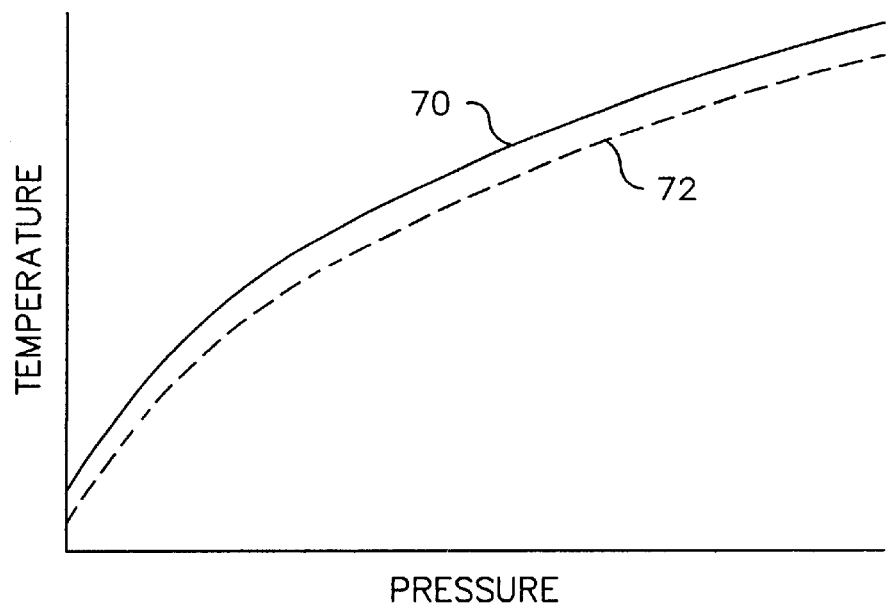
FIG. 12 is a graph showing, in a solid line, steam temperature plotted against steam pressure, and also showing, in a broken line, a subcooling curve for a steam trap utilizing the valve in accordance with the invention, illustrating the temperature at which condensate is discharged at any given pressure in the steam system with which the trap is associated.

As shown in FIG. 12, the relationship between steam pressure and steam temperature is a predetermined relationship depicted by curve 70. At a temperature of 212° F., for example, the steam pressure will be 0 psig. At a temperature of 300° F., the pressure will be approximately 52 psig. In a steam trap, the pressure acting on the condensate will be equal to the steam pressure in the system, but the temperature of the condensate as the trap begins to release it will be slightly below the temperature corresponding to the steam pressure. Thus, the temperature of the condensate will follow a curve 72, which is slightly below curve 70. As shown by FIG. 11, the position of the face of the elastomeric element, being biased by steam pressure, varies with temperature in a nearly straight line relationship.

Because the steam pressure tends to compress the elastomeric elements, urging the face of element 32 away from the valve seat, at a higher pressure, the valve will begin to open when the condensate is at a higher temperature. In other words, the operation of the steam trap, which is depicted by curve 72 follows the steam curve 70. The vertical distance between the two curves at any given pressure, that is, the difference between the steam temperature and the condensate temperature at which the valve begins to open is referred to as "subcooling" and can be adjusted by selection of an appropriate disc 38. Other ways in which subcooling can be adjusted will be described later.

Figure 5:
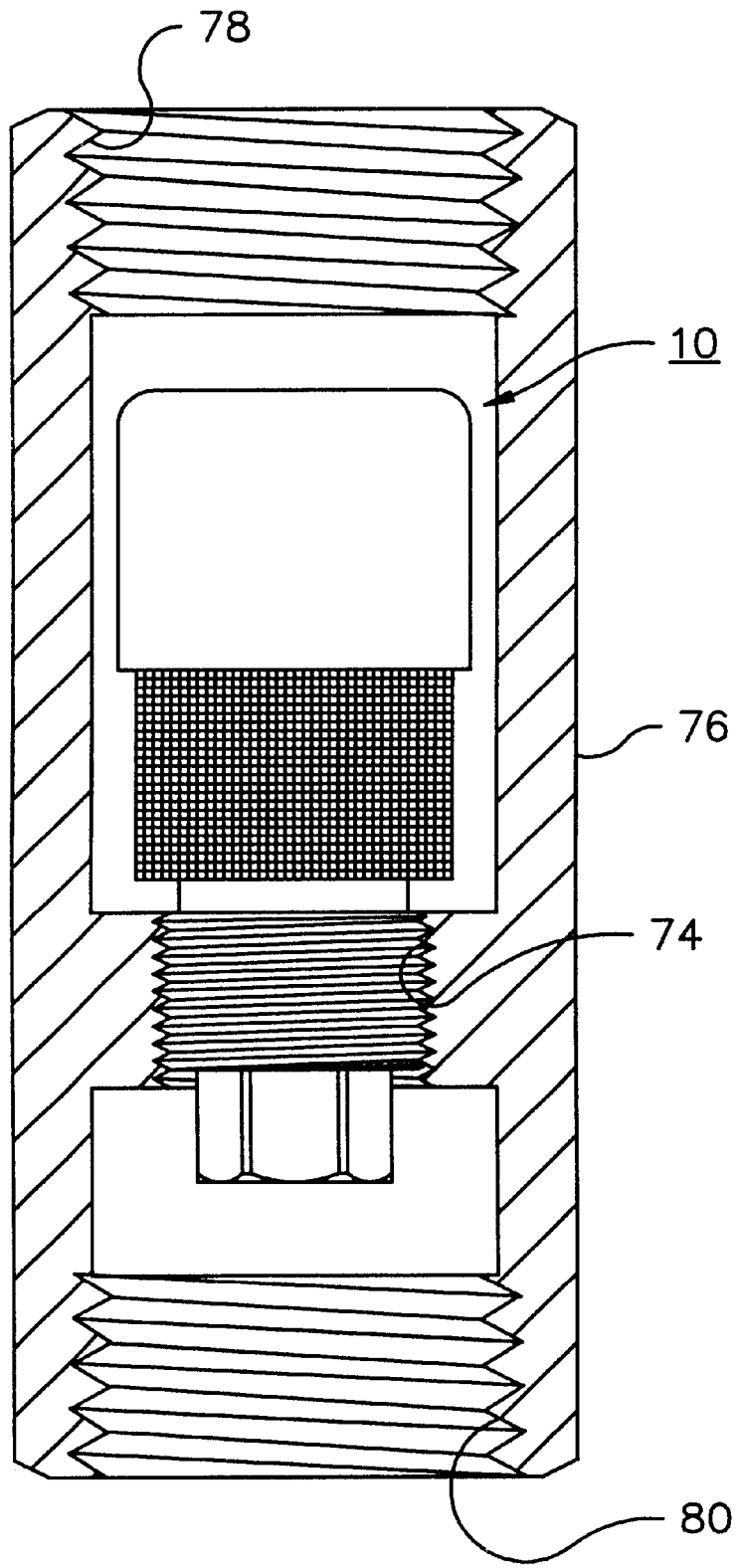
FIG. 5 is a sectional view showing the valve installed coaxially inside a tubular section of pipe.

In an application in which the valve is used as a steam trap, the valve can be installed in a system in several ways. One installation is depicted in FIG. 5, in which the valve 10 is engaged with internal threads 74 in a tubular fitting 76, so that the valve is in coaxial relationship with the fitting. The fitting has threads 78 at its upper end opening for connection with a steam system, and threads 80 at its lower end for connection to a condensate discharge line. The valve can be removed through the upper opening of the fitting for replacement when the fitting is disconnected from the steam system.

Figure 6:
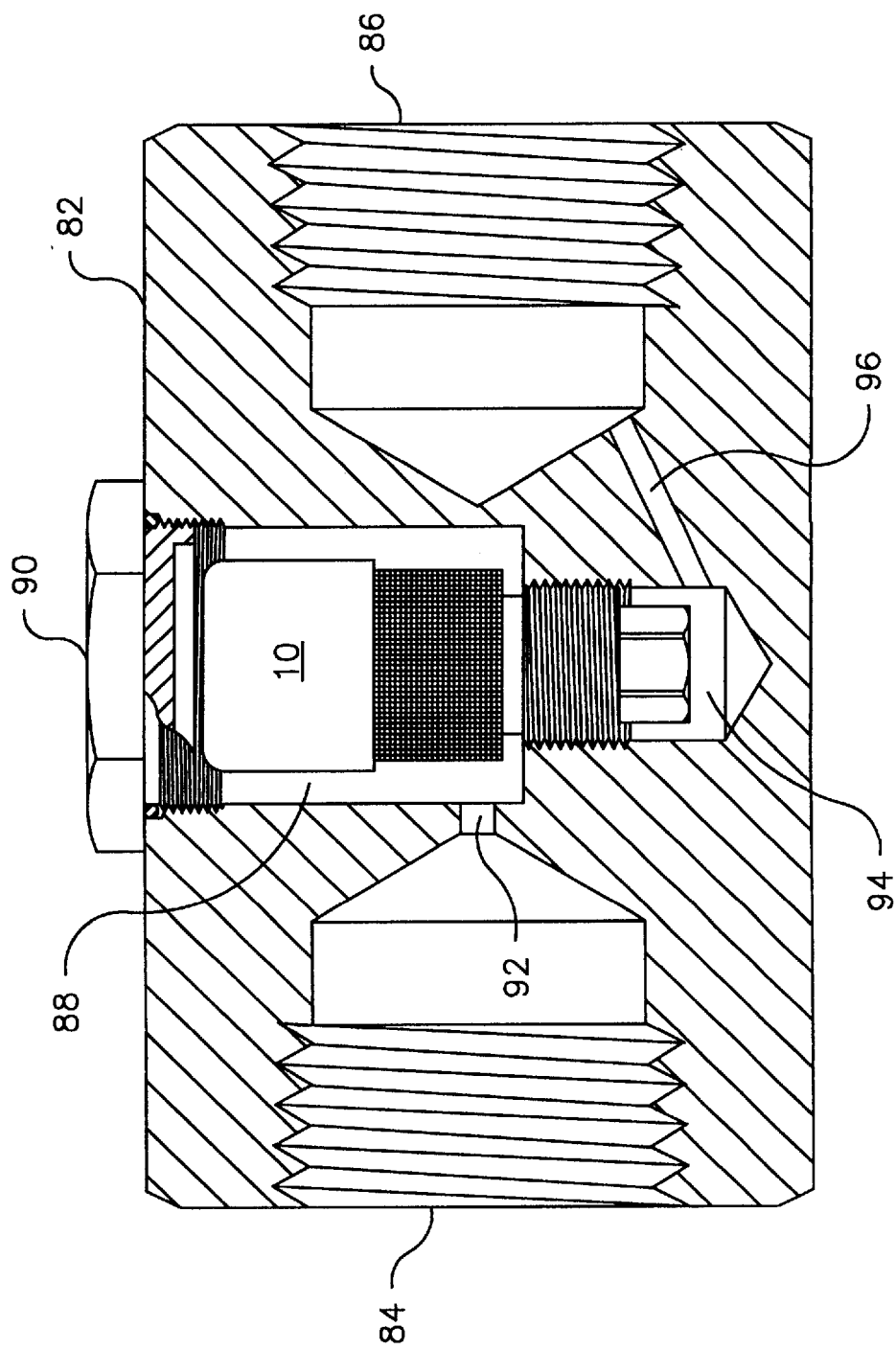
FIG. 6 is a sectional view showing a fitting having inlet and outlet end openings for fluid flow, with the valve in accordance with the invention installed in the fitting through a side opening.

In another steam trap application depicted in FIG. 6, the valve 10 is installed in a radial relationship with a fitting 82. The fitting 82 has a threaded port 84 for connection to the steam system, and a threaded condensate discharge port 86. The part of the valve body containing the elastomeric elements is situated in a chamber 88, which is closed by a removable threaded cap 90. Chamber 88 communicates with port 84 through a passage 92. The lower part of the valve 10 is threaded into a narrower chamber 94 below chamber 88, and the discharge opening of the valve 10 is situated within chamber 94, which communicates with the condensate discharge port 86 through a passage 96. In this device, the valve can be installed and removed from the fitting by removing cap 90, without disconnecting the fitting from the steam system.

Figure 7:
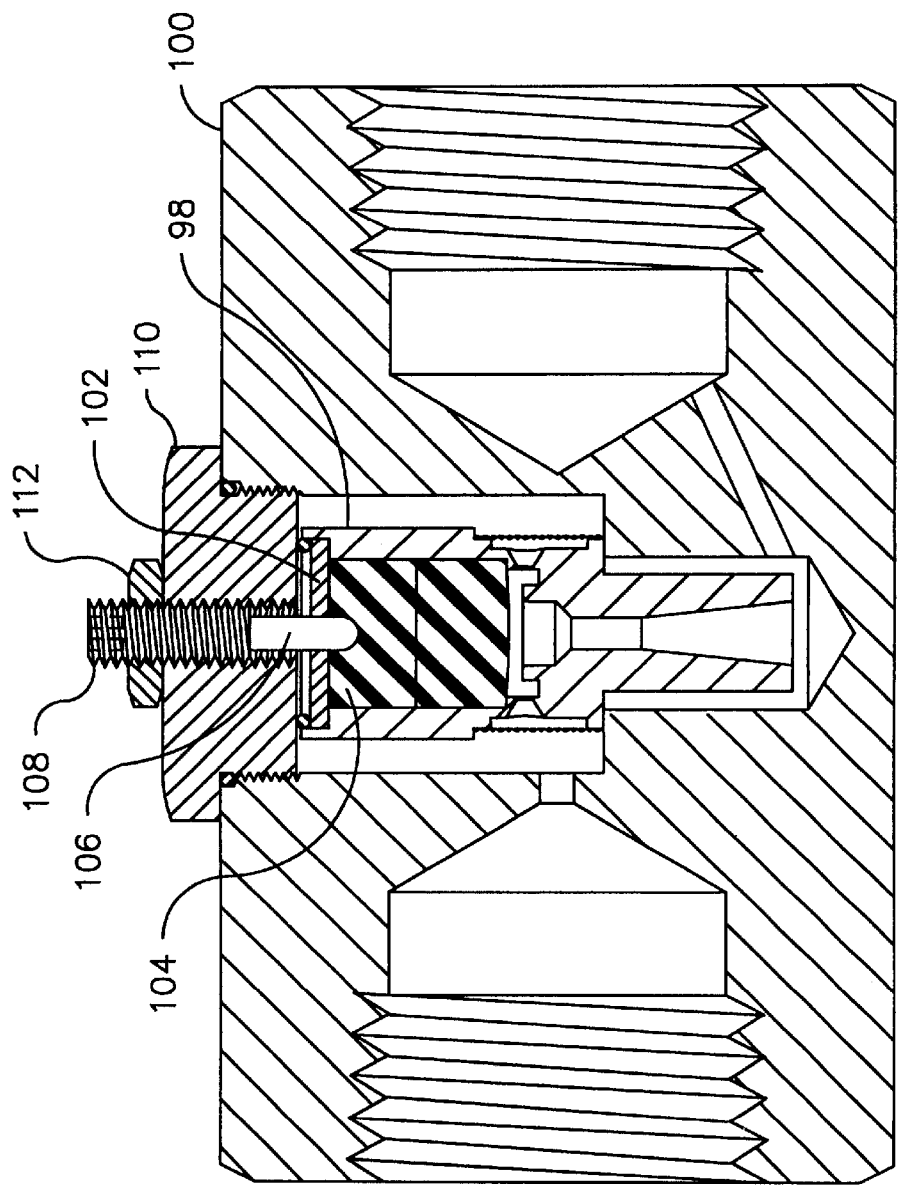
FIG. 7 is a sectional view showing a fitting similar to the fitting of FIG. 6, in which an adjustable valve in accordance with the invention is installed.

FIG. 7 shows a valve 98 installed radially in a fitting 100, which is identical to the fitting 82 in FIG. 6. The valve 98 is similar to the valve 10 shown in FIGS. 1–4, except that it has a central opening in the disc 102 which covers its upper elastomeric element 104. The central opening receives an adjusting plunger 106 which extends from a threaded element 108, and presses against the upper elastomeric element 104. The threaded element, which has a tool-receiving socket or slot (not shown) in its upper end, is threaded into a passage in a cap 110 and locked by a locking nut 112. The valve 98 can be removed by removing cap 110, and the degree of subcooling can be adjusted by turning threaded element 108.

Figure 8:
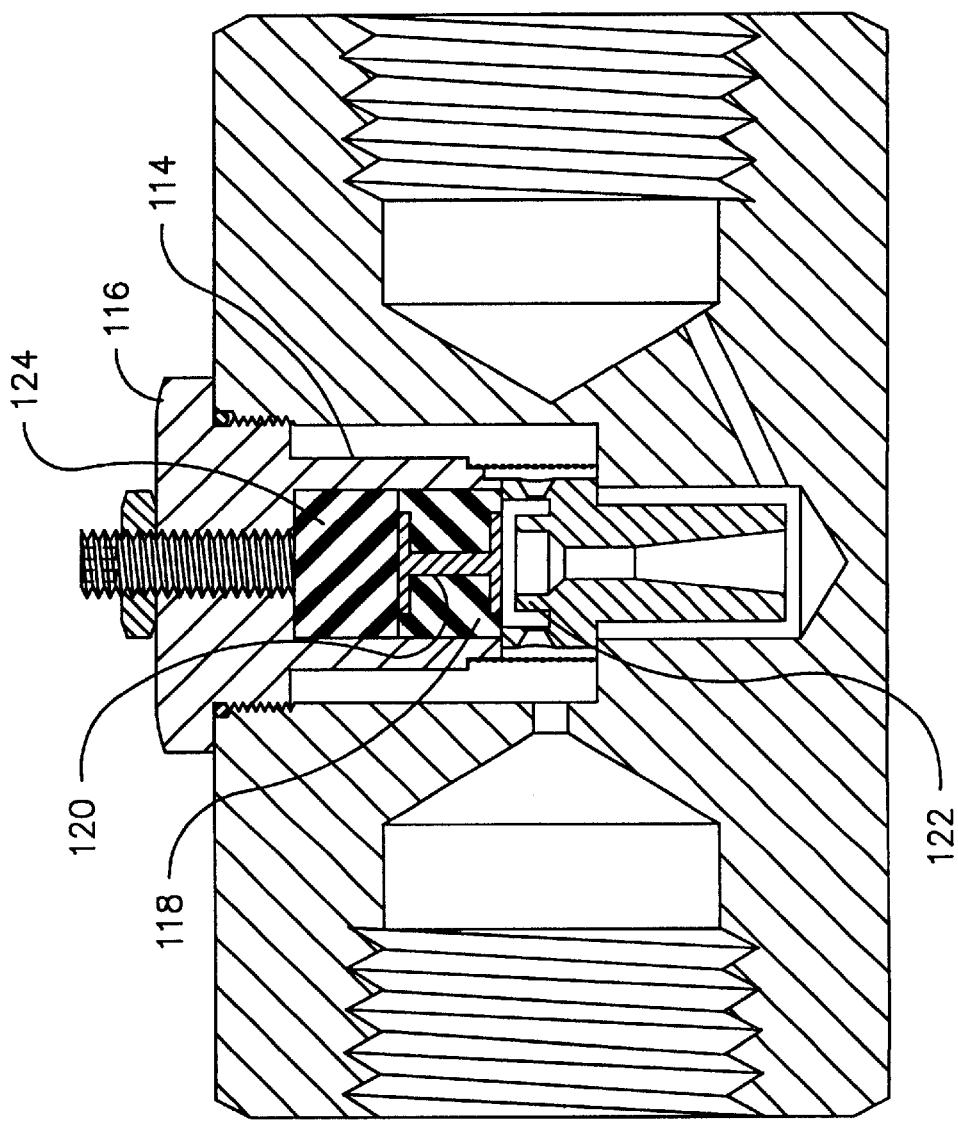
FIG. 8 is a sectional view showing a fitting similar to the fitting of FIG. 7, in which a spool is embedded in an elastomeric cylinder nearest the valve seat.

The assembly of FIG. 8, which includes a valve 114, is an externally adjustable assembly similar to the assembly of FIG. 7, except that the cap 116 is an integral part of the valve, the threaded adjuster itself serves as an adjusting plunger, and the lower element 118 of the valve 114 is molded on a spool-shaped member 120, which is engageable with the valve seat 122 as the upper element 124, which is an elastomeric element, expands with increasing temperature. The spool shaped member 120, which is embedded in element 118, can be made from metal, ceramic, or a wide variety of materials, preferably harder and more durable than the elastomer. The spool provides a hardened valve element, which is resistant to abrasion, and especially useful where flow of fluid at high pressure over long intervals of time, or repeated shorter intervals, is expected. In an alternative embodiment, the spool may be provided with ring-like projections (not shown) embedded in element 118, in which case the upper part of the spool can be eliminated.

Figure 9:
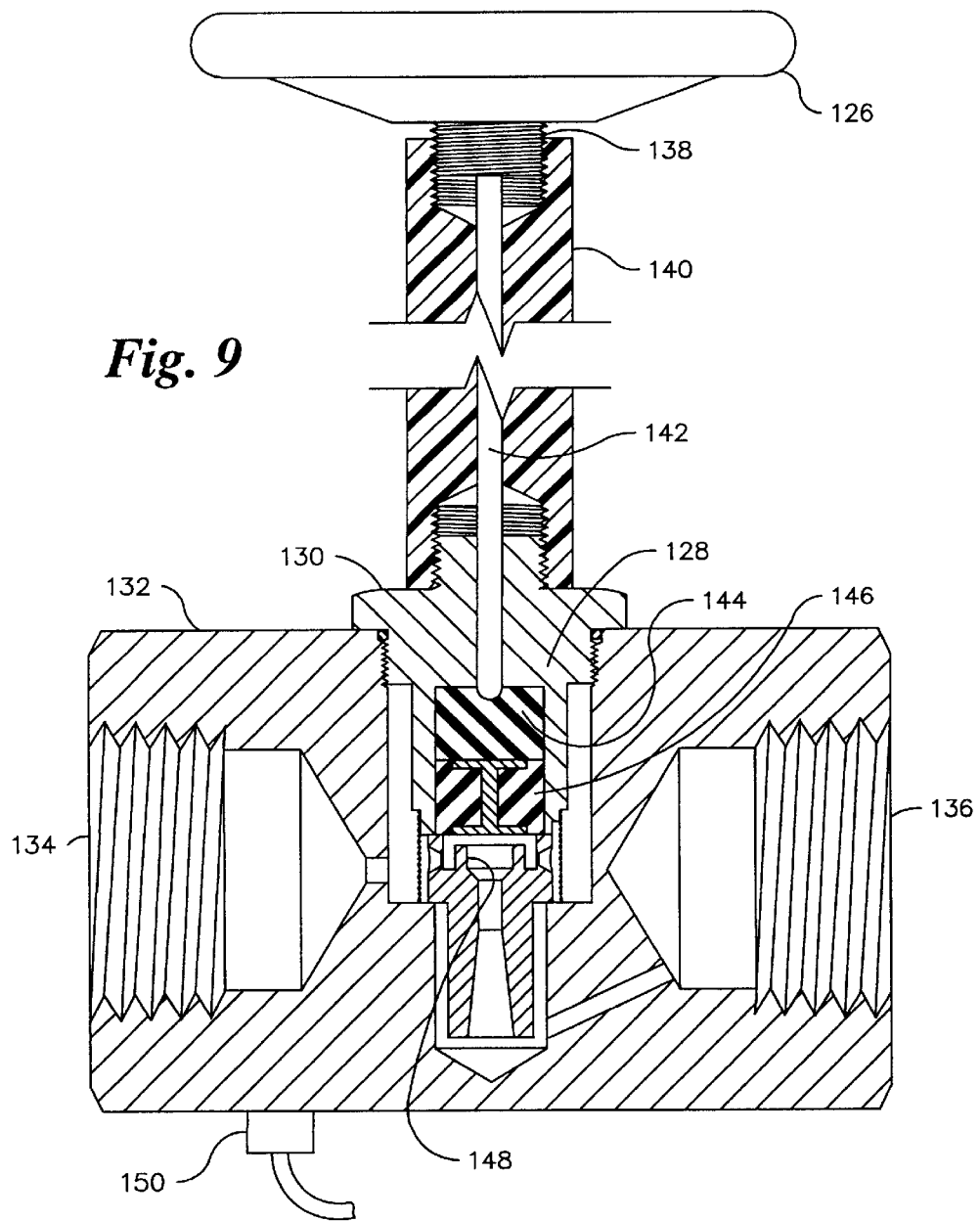
FIG. 9 is a sectional view showing a fitting similar to the fitting of FIG. 8 having an adjusting handwheel.

FIG. 9 shows an assembly comprising a valve similar to the valve of FIG. 8, but which is adjustable by a manually operable handwheel 126. The valve 128 has an integral cap 130, which is threaded into a radially facing opening in a fitting 132, having inlet and outlet ports 134 and 136, respectively. The handwheel has a threaded hub 138, which is threaded into the upper end of a sleeve 140 mounted on the cap. A stem 142, connected to the hub 138, extends through the sleeve, and through the cap to an upper elastomeric element 144, where it serves as a plunger similar to the plunger 106 in FIG. 7. By rotation of the handwheel in a first direction, e.g., clockwise, the hardened lower valve element 146 can be moved toward the seat 148. The resilience of the two valve elements causes them to return to their initial position, opening the flow path in the valve, when the handwheel is rotated in the opposite direction.

The assembly of FIG. 9 is useful where frequent adjustment is required, and may be used either as a temperature-responsive valve, or as a conventional valve in applications in which temperature responsiveness is not needed. A temperature sensor 150 may be incorporated into the assembly, for connection to a temperature display device in order to allow the user to set the degree of subcooling, when the assembly is used as a temperature-responsive valve, for example, as a steam trap.

Figure 10:
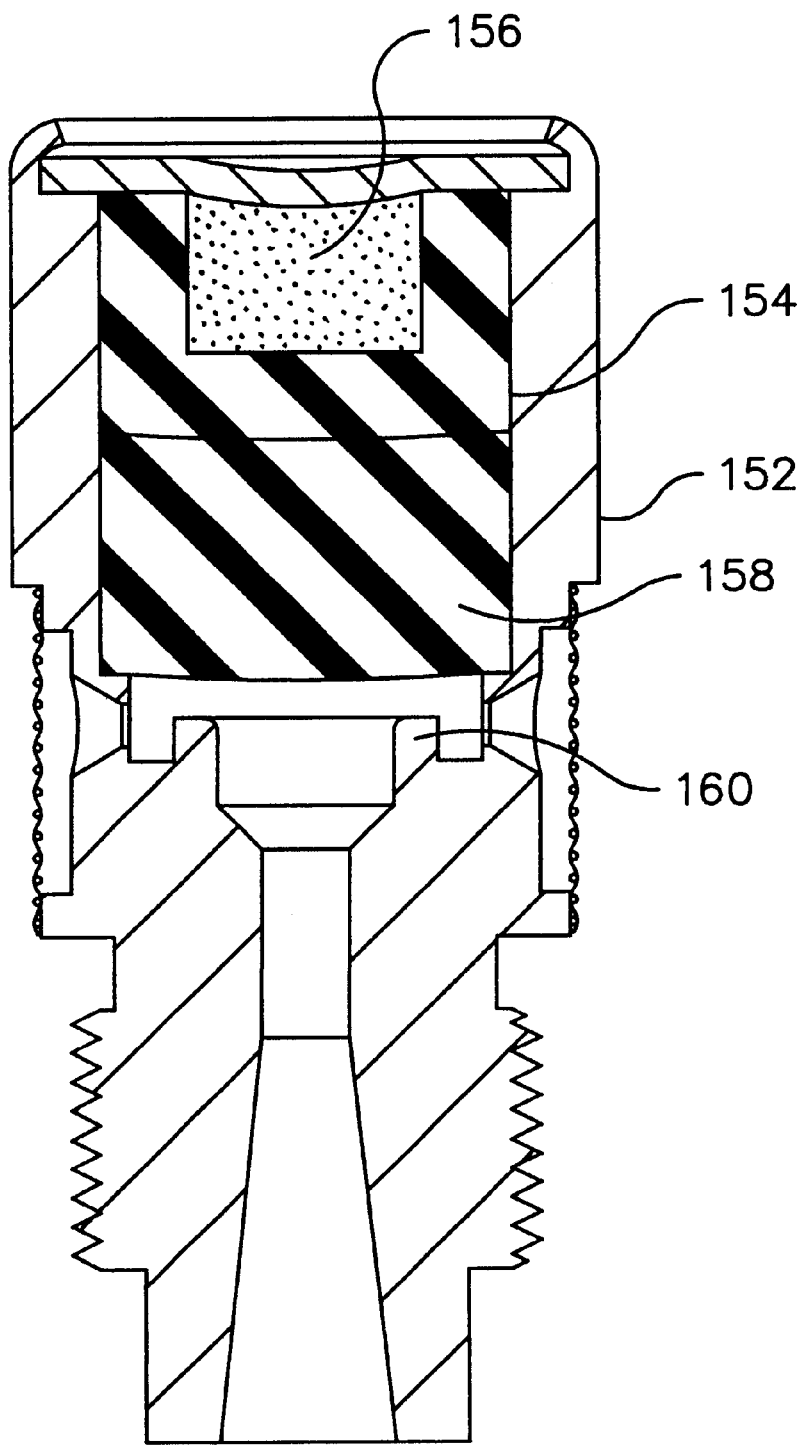
FIG. 10 is a sectional view of a valve similar to the valve of FIGS. 1–4, but having a body of thermally responsive wax embedded in one of its two elastomeric cylinders.

The valve 152, shown in FIG. 10 is similar to the valve of FIGS. 1–4, except that the upper elastomeric element 154 has a hollow interior, filled with a thermally responsive wax 156 or other suitable thermally responsive, expansible material such as the thermally responsive composition described in U.S. Pat. No. 5,816,493. The wax or other thermally responsive material can be used to enhance the responsiveness of the valve elements to temperature changes. The thermally responsive, elastomeric material of the upper element 154 provides an effective seal to prevent escape of the wax, and the lower element 158 provides a simple and effective valve element, sealing off flow through the valve when in contact with the valve seat 160.

In each of the embodiments described above, the elastomeric elements expand with increasing temperature, and also with increasing fluid pressure, and consequently press against the cylindrical side wall of the cylindrical side wall of the space in which they are located. In the case of the screw or handwheel-adjustable valves of FIGS. 7–9, the pressure exerted by the elastomeric elements against the cylindrical side wall prevents leakage of fluid past the adjusting plunger and its associated threads.

Various modifications can be made to the valves described. For example, remote control of the valve of FIGS. 1–4 or FIG. 10 can be effected by electrical heating of the elastomeric valve elements. Instead of using two elastomeric elements, either one, or more than two such elements can be incorporated into the valve. Moreover, as in the case of FIGS. 8 and 10, the elements can have a different composition or construction.

Still other modifications may be made to the apparatus and method described above without departing from the scope of the invention as defined in the following claims.

What is claimed is:

1. A valve comprising:
   a housing comprising a tubular side wall, the side wall having first and second ends and surrounding an internal space, a first end wall at the first end of the side wall, defining one end of the internal space, a second end wall at the second end of the side wall, the second end wall having a centrally located aperture arranged to provide fluid communication between said internal space and the exterior of the housing, and at least one passage extending through the side wall at a location adjacent the second end wall and arranged to provide fluid communication between the exterior of the housing and said internal space;
   a valve element located within said internal space, the valve element contacting the side wall and the first end wall and substantially filling all of said internal space except for a portion thereof adjacent said second end of the side wall, at least the part of the valve element in contact with the side wall being formed of an elastomer; and
   a seat in the form of a boss surrounding the centrally located aperture of the second end wall and extending toward the first end wall;
   wherein the valve element is deformable from a first condition in which it is spaced from said seat and allows fluid communication between said at least one passage and said aperture, to a second condition in which a part of the valve element engages the seat, thereby closing said aperture and preventing fluid communication between said at least one passage and said aperture.

2. A valve according to claim 1, in which the temperature coefficient of expansion of the elastomer is in the range from 0.01%/° F. to 0.2%/° F.

3. A valve according to claim 1, in which the valve element is composed of a plurality of cylinders disposed in a stack in the housing.

4. A valve according to claim 1, in which the side wall is formed of metal, whereby heat is rapidly conducted through the side wall to and from the elastomer.

5. A valve according to claim 1, in which the first end wall comprises a metal plate secured to the sidewall, the metal plate having a face in contact with the valve element.

6. A valve according to claim 1, in which the first end wall comprises a metal plate secured to the side wall, the metal plate being bent into a dish shape, and having a convex face in contact with the elastomeric member.

7. A valve according to claim 1, in which the first end wall comprises a metal plate having an interior face in contact with the valve member, in which the side wall has a shoulder formed adjacent its first end and a crimped, thin-walled ring projecting from the shoulder, the metal plate being held against said shoulder by the crimped, thin-walled ring.

8. A valve according to claim 1, including a shoulder formed on the side wall, the shoulder being inside said internal space, adjacent said second end but spaced from said second end, and facing said first end wall, and in which the valve element has an end surface facing said second end wall, said end surface of the valve element having a peripheral area in engagement with the shoulder whereby at least said peripheral area is retained in spaced relationship with the second end wall.

9. A valve according to claim 1, in which the housing includes a passage connecting said aperture with the exterior of the housing, said passage having a narrow portion narrower than said aperture, and a connecting portion converging from said aperture to the narrow portion.

10. A valve according to claim 1, in which the side wall has an exterior face and an interior face, and each said passage extending through the side wall at a location adjacent the second end wall has an outer end opening in the exterior face of the side wall, an inner end opening in the interior face of the side wall, and a tapered portion extending through a portion of the side wall between the inner and outer end openings, the tapered portion having a wider end toward the exterior of the housing and a narrower end toward the interior of the housing.

11. A valve according to claim 1, in which the side wall has an exterior face and an interior face, in which said boss surrounding the centrally located aperture of the second end wall is spaced from the side wall, and in which each said passage extending through the side wall at a location adjacent the second end wall has an inner end opening in the interior face of the side wall directly opposite to said boss, whereby a space between the boss and the side wall provides a larger cross-section to the flow of fluid than the space between the boss and the valve element when the valve element is spaced from the boss to allow fluid communication between said at least one passage and said aperture.

12. A valve according to claim 1, in which
   the housing includes a passage connecting said aperture with the exterior of the housing, said passage having a narrow portion narrower than said aperture, and a connecting portion converging from said aperture to the narrow portion;
   the side wall has an exterior face and an interior face, and each said passage extending through the side wall at a location adjacent the second end wall has an outer end opening in the exterior face of the side wall, an inner end opening in the interior face of the side wall, and a tapered portion extending through a portion of the side wall between the inner and outer end openings, the tapered portion having a wider end toward the exterior of the housing an a narrower end toward the interior of the housing; and
   said boss surrounding the centrally located aperture of the second end wall is spaced from the side wall, and in which each said passage extending through the side wall at a location adjacent the second end wall has an inner end opening in the interior face of the side wall directly opposite to said boss, whereby a space between the boss and the side wall provides a larger cross-section to the flow of fluid than the space between the boss and the valve element when the valve element is spaced from the boss to allow fluid communication between said at least one passage and said aperture.

13. A valve according to claim 1, in which the housing includes a passage connecting said aperture with the exterior of the housing, said passage having a central portion narrower than said aperture, a connecting portion converging from said aperture to the central portion, and a diverging portion connecting the central portion to the exterior of the housing.

14. A valve according to claim 1, in which the side wall has an exterior face and an interior face, and each said passage extending through the side wall at a location adjacent the second end wall has an outer end opening in the exterior face of the side wall, an inner end opening in the interior face of the side wall, and a tapered portion extending through a portion of the side wall between the inner and outer end openings, the tapered portion having a wider end toward the exterior of the housing and a narrower end toward the interior of the housing, in which said boss surrounding the centrally located aperture of the second end wall is spaced from the side wall, and a space between the boss and the side wall provides a cross-section to the flow of fluid larger than the total of the cross-sections of the narrower ends of said tapered portions.

15. A valve according to claim 1, in which the side wall has an exterior face and an interior face, in which said boss surrounding the centrally located aperture of the second end wall is spaced from the side wall, and in which each said passage extending through the side wall at a location adjacent the second end wall has an inner end opening in the interior face of the side wall directly opposite to said boss, whereby a space between the boss and the side wall provides a larger cross-section to the flow of fluid than the space between the boss and the valve element when the valve element is spaced from the boss to allow fluid communication between said at least one passage and said aperture, and in which said centrally located aperture in the second end wall of the housing also has a cross-section larger than said space between the boss and the valve element.

16. A valve according to claim 1, in which the housing includes a passage connecting said aperture with the exterior of the housing, said passage having a central portion narrower than said aperture, a connecting portion converging from said aperture to the central portion, and a diverging portion connecting the central portion to the exterior of the housing;

the side wall has an exterior face and an interior face, and each said passage extending through the side wall at a location adjacent the second end wall has an outer end opening in the exterior face of the side wall, an inner end opening in the interior face of the side wall, and a tapered portion extending through a portion of the side wall between the inner and outer end openings, the tapered portion having a wider end toward the exterior of the housing and a narrower end toward the interior of the housing, in which said boss surrounding the centrally located aperture of the second end wall is spaced from the side wall, and a space between the boss and the side wall provides a cross-section to the flow of fluid larger than the total of the cross-sections of the narrower ends of said tapered portions; and each said passage extending through the side wall at a location adjacent the second end wall has an inner end opening in the interior face of the side wall directly opposite to said boss, whereby a space between the boss and the side wall provides a larger cross-section to the flow of fluid than the space between the boss and the valve element when the valve element is spaced from the boss to allow fluid communication between said at least one passage and said aperture, and in which said centrally located aperture in the second end wall of the housing also has a cross-section larger than said space between the boss and the valve element.

17. A valve according to claim 1, having a plurality of passages extending through the side wall at locations adjacent the second end wall and arranged to provide fluid communication the exterior of the housing and said internal space.

18. A valve according to claim 1, in which the side wall has an exterior face and an interior face, in which the exterior face has an annular recess in a portion adjacent its said second end, in which the side wall has a plurality of passages extending through the said portion of the side wall having the annular recess, the plurality of passages being arranged to provide fluid communication between the exterior of the housing and said internal space, and a filter screen spanning said recess.

19. A valve according to claim 1, in which said second end wall has an extension with external threads for mounting the valve.

20. A valve according to claim 1, having an opening in the second end wall, and a plunger extending through said opening, the plunger having an end in contact with, and exerting a compressive force on, the valve element, and being adjustable to control the force exerted on the valve element, whereby the size of said portion of the internal space adjacent said second end of the side wall can be adjusted.

21. A valve according to claim 1, in which the valve element is composed substantially entirely of elastomer.

22. A valve according to claim 1, in which the valve element is composed in part of an elastomer, and includes a thermally expansible material having a coefficient of expansion greater than that of the elastomer, said thermally expansible material being situated in an interior space within the valve element and surrounded by part of the elastomer.

23. A valve according to claim 1, in which the valve element includes a rigid element embedded in said elastomer, the part of the valve element which engages the seat being a part of said rigid element.

\* \* \* \* \*